US012039487B2

(12) United States Patent
Morgan et al.

(10) Patent No.: US 12,039,487 B2
(45) Date of Patent: Jul. 16, 2024

(54) COMPUTER-VISION PICKUP SYSTEM AND METHODS

(71) Applicant: NCR Voyix Corporation, Atlanta, GA (US)

(72) Inventors: Kip Oliver Morgan, Atlanta, GA (US); Caleb Wayne Martinez, Fayetteville, GA (US); Aleah Jean Kadry, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 507 days.

(21) Appl. No.: 17/411,271

(22) Filed: Aug. 25, 2021

(65) Prior Publication Data

US 2023/0061441 A1 Mar. 2, 2023

(51) Int. Cl.
| | | |
|---|---|---|
| *G06Q 30/06* | (2023.01) | |
| *G06Q 10/0836* | (2023.01) | |
| *G06Q 30/0601* | (2023.01) | |
| *G06T 7/00* | (2017.01) | |
| *G06V 10/70* | (2022.01) | |
| *G06V 30/40* | (2022.01) | |
| *H04N 7/18* | (2006.01) | |
| *G06Q 10/087* | (2023.01) | |
| *G06V 30/19* | (2022.01) | |

(52) U.S. Cl.
CPC ..... *G06Q 10/0836* (2013.01); *G06Q 30/0641* (2013.01); *G06T 7/0002* (2013.01); *G06V 10/70* (2022.01); *G06V 30/40* (2022.01); *H04N 7/185* (2013.01); *G06Q 10/087* (2013.01); *G06T 2207/10016* (2013.01); *G06V 30/19007* (2022.01)

(58) Field of Classification Search
CPC .......... G06Q 10/0836; G06Q 30/0641; G06Q 10/087; G06Q 30/0633; G06T 7/0002; G06T 2207/10016; G06V 10/70; G06V 30/40; G06V 30/19007; G06V 20/40; G06V 20/52; G06V 20/63; H04N 7/185
See application file for complete search history.

(56) References Cited

U.S. PATENT DOCUMENTS

2019/0005449 A1* 1/2019 Smith ................ G06Q 10/0836
2022/0237543 A1* 7/2022 Bjelcevic ............. G06Q 10/087

* cited by examiner

*Primary Examiner* — Chuong A Ngo
(74) *Attorney, Agent, or Firm* — Schwegman Lundberg & Woessner, P.A.

(57) ABSTRACT

Real-time video is captured of a pickup area for orders at a store. The images are analyzed and tracked for unique orders being placed in the pickup area and orders being removed from the pickup area. A customer-operated device is operated by a customer to identify the store where the customer placed an order in a remote location from the pickup area. Images of the orders that are present within the pickup area and order identifying information for the orders are provided to the customer via the customer-operated device.

20 Claims, 3 Drawing Sheets

COMPUTER-VISION PICKUP SYSTEM AND METHODS

BACKGROUND

In the current market, restaurants are offering to-go orders at a higher rate than any time before in the industry. This has forced many restaurants to open an order pickup area, where customers can pickup finalized orders. While the intent of to-go orders is to keep people safe during the COVID19 pandemic, people gather around these pickup areas waiting for the orders to be completed. In fact, these areas may unintentionally spread the virus due to large amounts of people attempting to wait in small pickup areas of restaurants to retrieve their orders.

Furthermore, people often incorrectly pickup the wrong order or the staff in the pickup areas mix up orders (handing incorrect orders to customers waiting for pickup), such that many customers are becoming frustrated with the level of perceived service provided by restaurants. Few things are more frustrating to a customer than to have a to-go order incorrectly fulfilled for whatever reason.

Still further, a to-go order in the pickup area can be waiting for an extended period of time to be pickup by a late-arriving customer or a to-go order can be sitting in the pickup area for an extended period of time when a customer, who is present in the pickup area, is completely unaware their order is ready for pickup. In either situation, the end result is that cold food items become warm (frozen food items can melt) and hot food items become cool.

Restaurants have already been forced to implement a variety of health-conscious safety protocols/equipment, raised wages, and enhanced employee benefits of their staff in an effort to obtain needed workers or to retain existing workers because of the pandemic. Most restaurants simply do not have the resources to expand the pickup area into a sufficient socially-distanced space for their workers and customers. Furthermore, most restaurants do not have the resources to invest heavily in a fully integrated technology-based solution.

SUMMARY

In various embodiments, methods and a system for computer-vision order pickup are provided.

According to an embodiment, a method for computer-vision pickup is presented. As an example, an identifier for a retail store is received from a mobile device operated by a customer who placed an order with the retail store. A video stream for a camera associated with a pickup area of the retail store where completed orders are placed when completed by the retail store is obtained based on the identifier. The completed orders are monitored when placed in the pickup area and when removed from the pickup area by analyzing the video stream and producing completed order information from the video stream. The completed order information is rendered in real time to an interface of the mobile device for viewing by the customer in a remote location from the pickup area.

DETAILED DESCRIPTION

Figure 1:
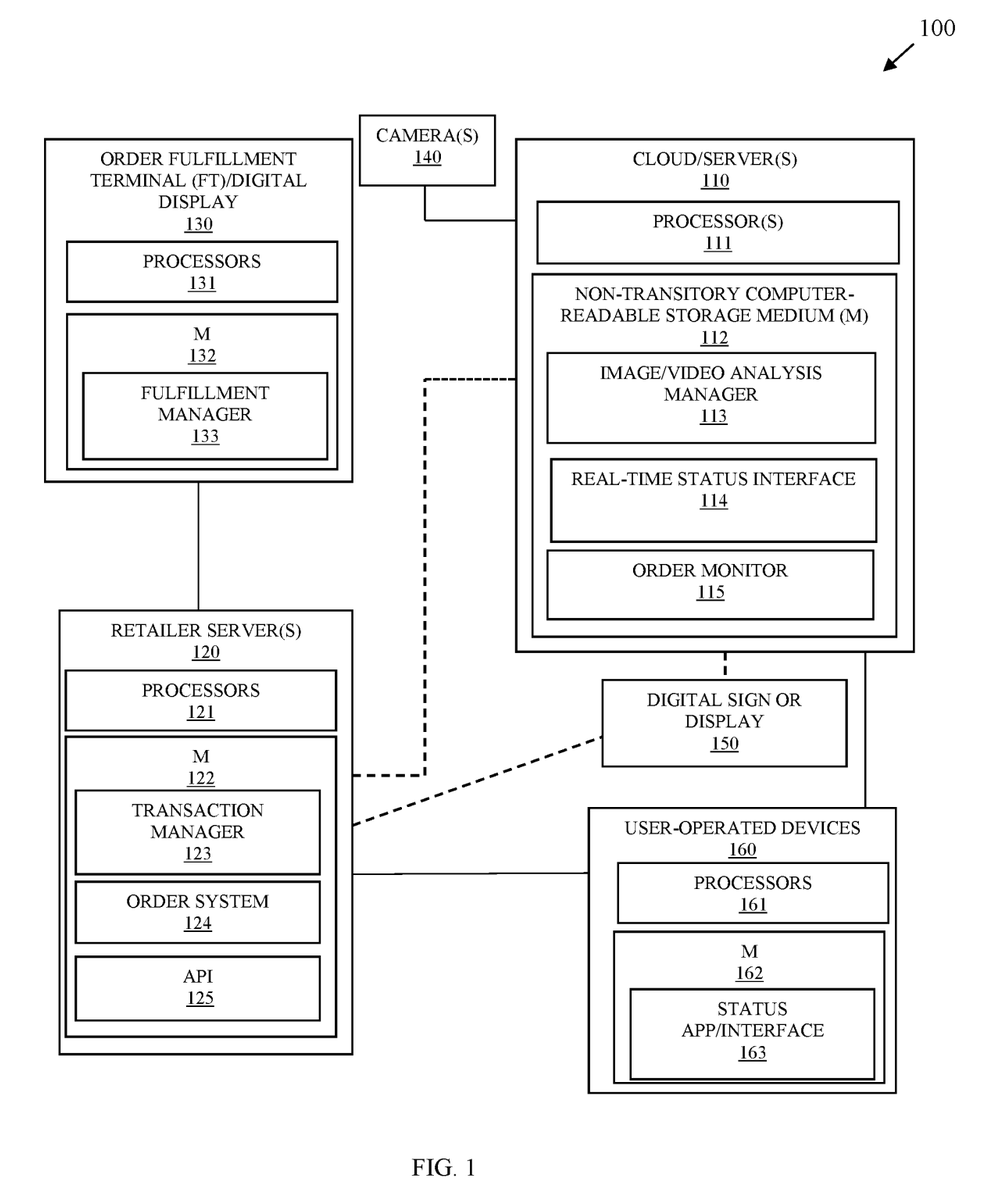
FIG. 1 is a diagram of a system for computer-vision pickup, according to an example embodiment.

FIG. 1 is a diagram of a system/platform 100 for computer-vision pickup, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of computer-vision pickup, presented herein and below.

System/platform 100 (herein after just "system 100") provides a processing environment by which computer vision is employed to provide real-time pickup information for to-go orders to customers of a given restaurant. One or more network cameras (located in a pickup area of a given restaurant) capture video/images of a to-go order pickup area. The video/images are analyzed to identify order tickets placed on fulfilled to-go orders within the pickup area. The ticket images are further analyzed, such as by processing Optical Character Recognition (OCR) on ticket images, and order details are determined for each to-go order that is available for customer pickup. Separately, customers wait in a location of their choosing, such as their vehicles in a parking lot of the restaurant or outdoors in proximity to the restaurant. A digital display within mobile device camera range presents a unique Quick Response (QR) code that is encoded with an identifier for the restaurant and encoded with a website or application download site associated with system 100. When a customer opens his/her camera application and points the camera of their mobile device at the QR code, a mobile application (app) or a website interface is presented to the customer on their mobile device. System 100 identifies the restaurant from the restaurant identifier encoded in the QR code. System 100 obtains the live camera video feed for the camera located in the to-go order pickup area of the restaurant, identifies the ticket orders from packaging of the fulfilled to-go orders in the images, derives order details from the ticket images, and renders within the app or the interface legible and readable ticket images. The customer may, optionally, identify via the app or interface any ticket or order details unique to the customer, such as order number, name used for the order, all or partial details of the ordered items, etc. System 100 may then specifically filter the ticket images for the customer-provided information and raise an alert within the app or interface when the customer's specific order is identified (via computer vision) as being present in the to-go pickup area of the restaurant.

As used herein, the terms "customer," "consumer," and/or "user" may be used interchangeably and synonymously herein and below. This refers to an individual that has placed on order with an establishment for one or more items/goods for pickup.

System 100 comprises a cloud/server 110, one or more retailer servers 120 (optional), one or more order fulfillment terminals/digital displays 130 (optional), one or more cameras 140, one or more digital signs or displays 150 (optional), and a plurality of user-operated devices 160.

Cloud/Server 110 comprises at least one processor 111 and a non-transitory computer-readable storage medium 112. Medium 112 comprises executable instructions for an image/video analysis manager 113, a real-time status interface 114, and an order monitor 115. The executable instructions when provided to and executed by processor 111 from medium 112 cause processor 111 to perform the processing discussed herein and below for image/video analysis manager 113, real-time status interface 114, and order monitor 115.

Each (optional) retailer server 120 comprises at least one processor 121 and a non-transitory computer-readable storage medium 122. Medium 122 comprises executable instructions for a transaction manager 123, an order system 124, and an Application Programming Interface (API) 125. The executable instructions when provided to and executed by processor 121 from medium 122 cause processor 121 to perform the processing discussed herein and below for transaction manager 123, order system 124, and API 125

Each (optional) order fulfillment terminal/digital sign 130 comprises at least one processor 131 and a non-transitory computer-readable storage medium 132. Medium 132 comprises executable instructions for a fulfillment manager 133. The executable instructions when provided to and executed by processor 131 from medium 132 cause processor 131 to perform the processing discussed herein and below for fulfillment manager 133.

One or more cameras 140 are located proximate or adjacent to a retailer's item pickup area within retailer's store. Each camera 140 has access to a network connection (wired, wireless, or a combination of wired and wireless) for purposes of streaming or storing time and date stamped image frames (images or video) in a network location or directly to order monitor 115. Monitor 115 has access to the network location or receives the video feed directly from camera 140.

Digital sign or display 150 (optional) comprises a processor and non-transitory computer-readable storage media having executable instructions that permit the digital sign or display 150 to receive images, graphics, text, video, etc. from order monitor 115 for purposes of displaying a code (such as the QR code discussed above) to customers proximate or adjacent to a given retailer's store for capture by a camera of a customer's mobile device 160.

Each user-operated device 160 comprises at least one processor 161 and a non-transitory computer-readable storage medium 162. Medium 162 comprises executable instructions for a status app/browser-based interface 163. The executable instructions when provided to and executed by processor 161 from medium 162 cause processor 161 to perform the processing discussed herein and below for order app/interface 163.

Initially a given retailer registers each store for the computer-vision pickup services provided by cloud/server 110. During registration, the retailer is provided codes, each code encoded with an identifier for the retailer, a unique identifier for a given retailer's store and camera identifiers for cameras located in the order pickup area of the given store associated with the store identifier. In an embodiment, the retailer provides its own codes with the retailer identifier, the location of a given store, store identifier, and camera identifier encoded in a format that can be identified by order monitor 115. During registration, each camera 140 is configured to store date and time stamped image frames from its video feed into a network storage location, which monitor 150 has security permission to access. In an embodiment, each camera 140 is configured to stream the date and time stamped video/image frames directly to cloud/server 110 and/or monitor 115.

To complete registration, the retailer displays the code assigned to each store at one or more locations of that store. In an embodiment, order monitor 115 is given network access to a digital sign or display 150 for purposes of displaying a given store's code at the given store's location. In an embodiment, the retailer displays the code as a printed label on a surface or bulletin board at the retailer store assigned the code. The retailer can elect to display a given store's code in multiple locations at the store's location through digital signs or displays 150 (controlled and operated by the retailer) and/or through printed labels on a variety of surfaces (doors, windows, walls, bulletin boards, etc.).

The broken lines illustrated in FIG. 1 are intended to illustrate optional connections for system 100. For example, integration between a retailer's order system 124 with order monitor 115 can be provided in some embodiments. Order monitor 115 may operate and have access directly to a digital sign or display 150 for purposes of displaying a given store's code. Order system 124 may operate and control displaying of a store's code on its digital sign or display 150.

Once a given store for a given retailer are registered with cameras 140 operational and with the store's code displayed. The images or image frames captured of the pickup area of the store are monitored in real time by order monitor 115.

Order monitor 115 provides the image frames to image/video analysis manager 113. Image/Video analysis manager 113 tracks for changes in prior image images from current image frames being processed, a changed frame indicating that an ordered item was recently placed in the pickup area or that an order item was recently taken and removed from the pickup area. Analysis manager 113 may further be trained on background images that remain static and consistent to detect from the image frames dynamic and changing objects that represent order items, packaging for the ordered items, and order tickets affixed on the packaging or on the ordered items. Analysis manager 133 inspects the dynamic and changing objects for features associated with writing or printing that was placed on each ordered item, packaging of the ordered item, or an order ticket. Ticket/Writing features are identified and adjusted to account for a known angle and distance from which camera 140 captured the corresponding image. The adjusted pixels associated with the printing or the writing are processed using Optical Character Recognition (OCR) and converted into digital recognized characters and numbers. Each ordered item placed in the pickup area is uniquely tracked via its printing or writing. Optionally, when a given ordered item is first placed in the pickup area, order monitor sets a unique timer and records the time of day when it was first placed in the pickup area.

Customers place orders for order items with order system 124 for a given store of the retailer. This can be done in any number of manners supported by the retailer, such as via a voice call, via a retailer-specific web-based or app-based interface, and/or via a third-party ordering service that uses its own API for interacting and placing the orders with order system 124.

Customers then operate their mobile devices 160 and open a camera application to capture a given store's code displayed via printed labels on surfaces or via digital signs or displays 150 at the store's location. This causes the camera application to display an option for the user to open a website via a browser interface 163 or download and run status app 163 along with the encoded information associated with the code. Order monitor 115 decodes the encoded information and retrieves the retailer identifier, the store identifier, and the camera identifier. This allows order monitor 115 to locate the video feed and tracked objects (e.g., tickets) for the pickup area of the corresponding store. A thumbnail image of each ticket/written information in legible and readable images that are rendered in a list view within status app/interface 163 by real-time status interface 114 for the customers to view and locate their specific ordered items via the readable printed ticket images or readable written information.

Optionally, real-time status interface 114 may sort the list view of ticket/written information in order based on the time with which each order was detected (with the oldest order listed first and the newest order listed last) based on the unique timer associated with each tracked order item (maintained by order monitor 115). Each timer for each ordered item may also be rendered by real-time status interface 114 within the list view of status app/interface 163 adjacent to or superimposed over a portion of the corresponding thumbnail image. Each timer representing an elapsed time that a given order was completed and placed in the pickup area. This allows the customers to determine how long their particular order has been ready for pickup.

Optionally, real-time status interface 114 may provide one or more options selectable by a given customer within status app/interface 163. For example, an option may include a field for the customer to enter identifying information of the customer and/or the order, such as customer name, order number, and/or some or all of the customer's ordered item details. Real-time status interface 114 provides the identifying information to order monitor 115, order monitor retrieves the OCR text information for each tracked order and performs a search to determine whether an order being tracked is present or not present within the pickup area. When the order is present in the pickup area, real-time status interface 114 is provided the thumbnail image for rendering to the customer within the status app/interface 162. When the order is not present, order monitor retains an association between a mobile device identifier associated with a given customer's device 160 and the identifying information for inspecting each new order detected within the pickup area and its written printed information produced by image video analysis manager 113, once the customer's order is detected from the identifying information in the pickup area, order monitor 115 sends an alert to customer's device 160 or an alert to real-time status interface 114. The alert can be a text message sent direct to device 160 or provided as a popup notification along with the corresponding thumbnail image of the order within status app/interface 163. In an embodiment, the alert can cause the device 160 to play a sound or vibrate the customer's phone.

Optionally, order monitor 115 provides identifying information to real-time status interface 114 for each thumbnail image of each order currently awaiting pickup in the pickup area. Real-time status interface 114 then presents a portion of the identifying information with each thumbnail image for each order. For example, an order name for a given order is presented adjacent to or superimposed on the corresponding thumbnail image for each of the images rendered within list view of status app/interface 163.

Optionally, retailer server 120 uses an API 125 that provides partial integration with order system 124 to order monitor 115. Order system 124 receives customer orders from transaction manager 123. Fulfillment manager 133 reports from a given store when an order is being worked on (in progress), when an order is pending for work (not started), and when an order is completed back to order system 124. Order system 124 uses API 125 to report order details (customer name, order/ticket number, and/or ordered items of each order) to order monitor 115. Order monitor 115 can then generate thumbnail images for the order details (identifying information) of each in progress and not started order. These self-generated images along with their corresponding identifying information are provided to real-time status interface 114 for viewing by customers within status app/interface 163. So, customers can see their order was receive and is in the queue with a status identifier representing orders that are in progress or not started even when there is no physical presence of their order available from the pickup area. This may alleviate customer concerns that the order was lost or not received by order system 124.

Optionally, real-time status interface 114 may render options within status app/interface 163 that permits two-way interaction between the customer and staff operating the fulfillment manager through order system 124 and API 125. For example, a customer may access an option indicating that the customer is onsite at the store for picking up their order. Real-time status interface 114 provides this notification to order monitor 115. Order monitor 115 uses API 125 to send the customer identifying information or order number when available to order system 124. Order system 124 interacts with fulfillment manager 133 to display an indication on a display for each order in the order queue where the customer has arrived at the store. This may allow staff to expedite some orders in the queue over other orders based on the presence of the customers at the store. The options within status app/interface 163 may also allow a customer to enter an estimated time of arrival, which is communicated in the displayed order queue to staff at the store through order monitor 115, API 125, and order system 124 to fulfillment manager 133. This may allow staff to delay starting some orders in the queue and prioritize the order of the order queue.

It is noted that integration between cloud/server 110 and retailer server 120 (including order fulfillment terminal 130) is an optional embodiment, such that no integration in some embodiments are required at all except for registration of the unique store code, image feed access via camera 140 to system 100, and displaying of the code at the corresponding store by the retailer. Thus, in some embodiments, system 100 is processed without changes in workflows and without changes to source code in transaction manager 123, order system 124, and/or fulfillment manager 133.

In an embodiment, image/video analysis manager 113 processes a trained machine learning model/algorithm (MLM) that is trained on identifying new orders and order tickets or writing on order packaging within a given pickup area.

In an embodiment, image/video analysis manager 113 produces the identifying information for each order item as a text document (such as a Portable Document Format (PDF®)). Order monitor 115 tracks each image via its corresponding text document provided by image/video analysis manager 113. Real-time status interface 114 renders the documents in a list view for selection and viewing by a customer through status app/interface 163. Here, real-time status interface 114 may perform customer searches of the text documents based on entered identifying information provided by a customer without requiring interaction with order monitor 115. In fact, status app/interface 163 may perform the searching on identifying information without interacting with real-time status interface 114 by searching through the rendered documents for the identifying information. Each text document representing each order is provided a unique document identifier by order monitor 115 that is associated with metadata retailed with each document (each order).

In an embodiment, when an image frame indicates a previous order is no longer in the pickup area. Order monitor 115 may mark a status identifier for the corresponding order as "collected" or "picked up." Real-time status interface 114 may continue to present the collected order within the order list view of status app/interface 163 along with the status indication of collected for some configured period of time (e.g., 10 minutes, 30 minutes, etc.). This may allow customers to identify when a different customer took their order if they have not yet picked up the order themselves and notify the retail store of the issue to either receive a refund or replace the order.

In an embodiment, the retail store displays its unique code with cloud/server 110 via a large sign or on a side wall of the store's building that faces or is visible from the store's parking lot. This can be a printed label of the code affixed to the sign or side wall or this can be a digitally rendered code on a digital sign or display 150. This way customers arriving at the store for their order can remain in their own cars in the parking lot and only enter the store and go to the pickup area when system 100 identifies that their order is ready for pickup or completed. The pickup area only includes customers that are there for completed orders and those customers are only in the store for a very short period of time. This enhances the social distancing and improves health safety during pandemics or health safety for immune compromised customers even when there is no pandemic.

In an embodiment, a customer may maintain status app 163 on their mobile device 160 and use it repeatedly for different retailers or different retail stores of a same retailer. Here, the customer may not have to rescan the code via device 160 (although this still can be done in the manners discussed above); rather, the customer enters store identifying information (store name, store location) or selects a store from a list of available stores rendered dynamically within status app 163 based on a current location of the customer's mobile device 160. Thus, after a first time of downloading the status app 163 to device 160, the customer is no longer required to scan a specific stores unique code.

In an embodiment, a customer may access vision-based pickup services for a given store by using a browser interface 163 and traversing to a website associated with order monitor 115. The website may be displayed on labels affixed to various surfaces at the store or may be provided as a link to the customer upon receiving notification of an order through a retailer specific app or through a third-party ordering app. Once at the website within browser interface 163, the customer can provide store identifying information or select the store from a list of available stores (which can be dynamically rendered based on the current location of device 160). In the embodiment, where a link is provided automatically upon notification of a received order, the code that identifies the store can be embedded in the link, such that order monitor 115 automatically access the video feed of the corresponding camera 140 when the customer activates or selects the link.

In an embodiment, image/video analysis manager 113, real-time status interface 114, and order monitor 155 are subsumed into retailer server 120, such that the retailer 120 maintains and operators its own computer-vision pickup service.

System 100 permits/provides a virtual or a logical pickup board for a given retail store. That is, a real-time rendering of the pickup area for the store is provided remotely and in real time to a given customer via status app/interface 163.

In an embodiment, the user-operated device 160 is a mobile phone, a tablet, a laptop, or a wearable processing device.

Figure 2:
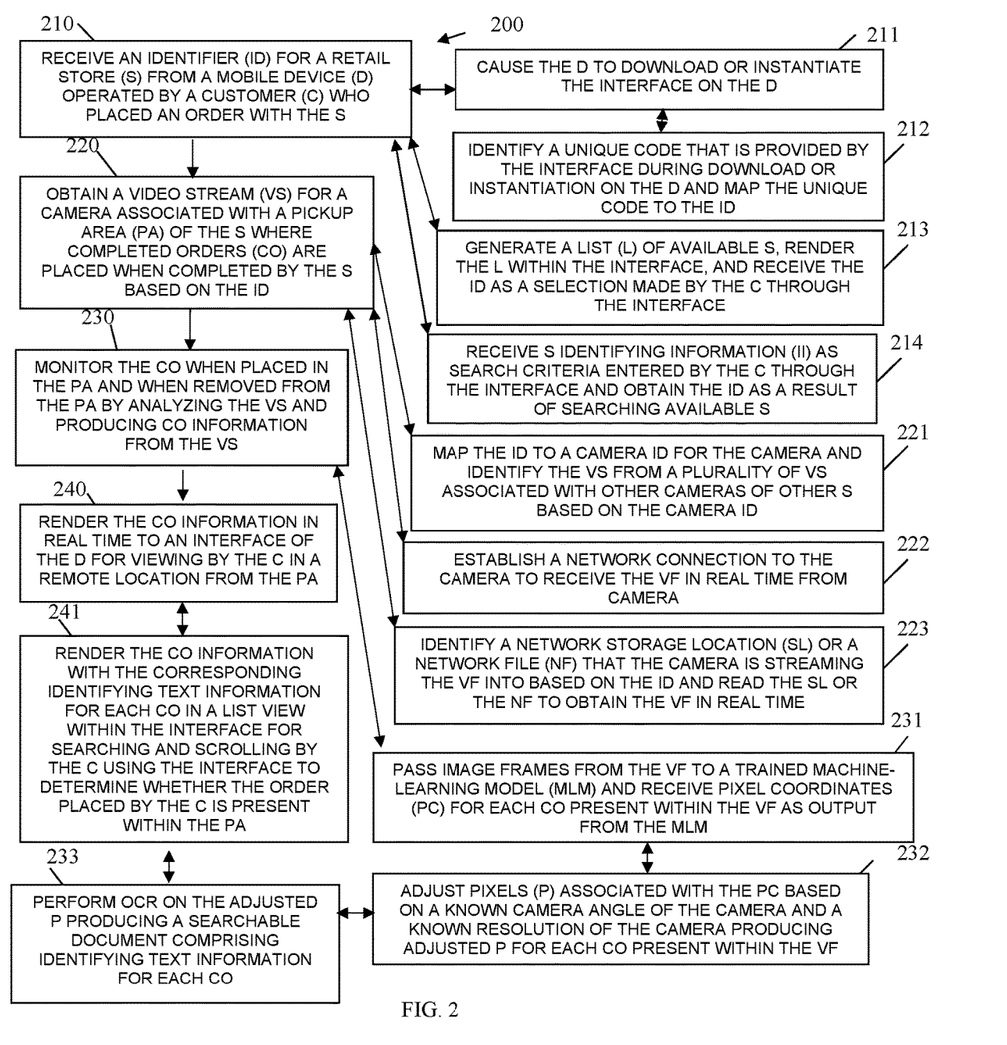
FIG. 2 is a diagram of a method for computer-vision pickup, according to an example embodiment.
Figure 3:
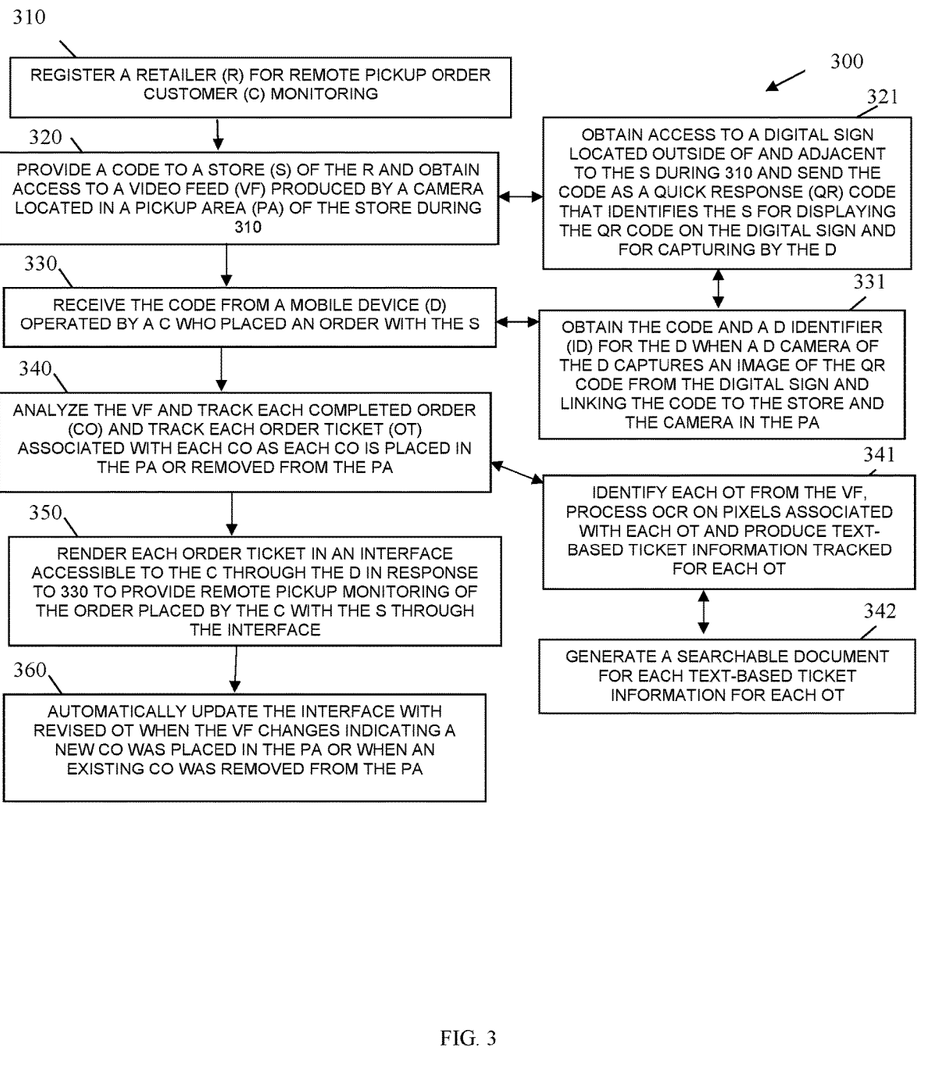
FIG. 3 is a diagram of another method for computer-vision pickup, according to an example embodiment.

The above-referenced embodiments and other embodiments are now discussed within FIGS. 2-3.

FIG. 2 is a diagram of a method 200 for computer-vision pickup, according to an example embodiment. The software module(s) that implements the method 200 is referred to as a "order pickup service." The order pickup service is implemented as executable instructions programmed and residing within memory and/or a non-transitory computer-readable (processor-readable) storage medium and executed by one or more processors of one or more devices. The processor(s) of the device that executes the order pickup service are specifically configured and programmed to process the order pickup service. The order pickup service may have access to one or more network connections during its processing. The network connections can be wired, wireless, or a combination of wired and wireless.

In an embodiment, the device that executes the order pickup service is cloud 110. Cloud 110 comprises a plurality of servers logically cooperating and accessible as a single server 110 (cloud 110).

In an embodiment, the device that executes the order pickup service is a server 110 that is separate from any given retailer server 120. In an embodiment server 110 is subsumed and operates on a specific retailer server 120.

In an embodiment, the order pickup service is all or some combination of 113, 114, and/or 115.

At 210, the order pickup service receives an identifier for a retail store from a mobile device 160 operated by a customer who placed an order with the retail store.

In an embodiment, at 211, the order pickup service causes the mobile device to download or instantiate an interface on the mobile device.

In an embodiment of 211, at 212, the order pickup service identifies a unique code that is provided by the interface during the download or instantiation on the mobile device and the order pickup service maps the unique code to the identifier for the retail store.

In an embodiment, at 213, the order pickup service generates a list of available retail stores, renders the list within the interface, and receives the identifier as a selection made by the customer through the interface.

In an embodiment, at 214, the order pickup service receives identifying information as search criteria entered by the customer through the interface and obtains the identifier as a result of searching available stores.

In an embodiment of 213 and/or 214, the list of available retail stores can be dynamically determined based on a current location of the customer's mobile device that is reported through the interface using location services of the mobile device.

At 220, the order pickup service obtains a video stream for a camera associated with a pickup area of the retail store where completed orders are placed when completed by the store based on the identifier.

In an embodiment, at 221, the order pickup service maps the identifier to a camera identifier for the camera and identifies the video stream from a plurality of video streams associated with other cameras of other retail stores based on the camera identifier.

In an embodiment, at 222, the order pickup service establishes a network connection to the camera to receive the video stream in real time from the camera.

In an embodiment, at 223, the order pickup service identifies a network storage location or a network file that the camera is streaming the video feed into based on the identifier and the order pickup service reads the network storage location or the network file to obtain the video feed in real time.

At 230, the order pickup service monitors the completed orders when placed in the pickup area and when removed from the pickup area by analyzing the video stream and producing completed order information from the video stream.

In an embodiment, at 231, the order pickup service passes image frames from the video freed to a trained MLM and the order pickup service receives pixel coordinates for each completed order present within the video feed as output from the MLM.

In an embodiment of 231 and at 232, the order pickup service adjusts pixels associated with the pixel coordinates based on a known camera angle of the camera and a known resolution of the camera producing adjusted pixels for each completed order present within the video feed.

In an embodiment of 232 and at 233, the order pickup service performs OCR on the adjusted pixels producing a searchable document that comprises identifying text information for each completed order.

At 240, the order pickup service renders the completed order information in real time to the interface of the mobile device for viewing by the customer in a remote location from the pickup area.

In an embodiment of 233 and 240, at 241, the order pickup service renders the completed order information with the corresponding identifying text information for each completed order in a list view within the interface for searching and scrolling by the customer using the interface to determine whether the order placed by the customer is present within the pickup area.

FIG. 3 is a diagram of another method 300 for computer-vision pickup, according to an example embodiment. The software module(s) that implements the method 300 is referred to as a "computer-vision order pickup board service." The computer-vision order pickup board service is implemented as executable instructions programmed and residing within memory and/or a non-transitory computer-readable (processor-readable) storage medium and executed by one or more processors of a device. The processors that execute the computer-vision order pickup board service are specifically configured and programmed for processing the computer-vision order pickup board service. The computer-vision order pickup board service may have access to one or more network connections during its processing. The network connections can be wired, wireless, or a combination of wired and wireless.

In an embodiment, the device that executes the computer-vision order pickup board service is cloud 110. In an embodiment, the device that executes the computer-vision order pickup board service is server 110. In an embodiment, server 110 is subsumed into and operates from a specific retailer server 120.

In an embodiment, the computer-vision order pickup board service is all of or some combination of 125, 113, 114, 115, and/or method 200 of FIG. 2.

The cloud-computer-vision order pickup board service presents another and, in some ways, enhanced processing perspective from that which was discussed above for cloud 110 and method 200.

At 310, the computer-vision order pickup board service registers a retailer for remote pickup order customer monitoring.

At 320, the computer-vision order pickup board service provides a code to a store of the retailer and obtains access to a video feed produced by a camera located in a pickup area of the store during registration at 310.

In an embodiment, at 321, the computer-vision order pickup board service obtains access to a digital sign located outside and adjacent to the store during registration at 310. The computer-vision order pickup board service sends the code as a QR code that identifies the store for displaying the QR code on the digital sign and for capturing by a mobile device operated by a customer awaiting a completed order outside of the store (such as in a parking lot of the store).

At 330, the computer-vision order pickup board service receives the code from the mobile device of the customer that placed the order with the store.

In an embodiment of 321 and 330, at 331, the computer-vision order pickup board service obtains the code and a mobile device identifier for the mobile device when a mobile device camera of the mobile device captures an image of the QR code from the digital sign. The computer-vision order pickup board service links the code to the store and the camera in the pickup area of the store.

At 340, the computer-vision order pickup board service analyzes the video feed and tracks each completed order and further transaction each order ticket associated with each completed order as each completed order is placed in the pickup area or removed from the pickup area.

In an embodiment, at 341, the computer-vision order pickup board service identifies each order ticket from the video feed, processes OCR on pixels associated with each order ticket, and produces text-based ticket information tracked for each order ticket from the video feed.

In an embodiment of 341 and at 342, the computer-vision order pickup board service generates a searchable document for each text-based ticket information of each order ticket.

At 350, the computer-vision order pickup board service renders each order ticket within an interface accessible to the customer through the mobile device in response to receiving the code from the mobile device at 330 to provide remote pickup monitoring of the order placed by the customer with the store through the interface.

In an embodiment of 342 and 350, at 351, the computer-vision order pickup board service automatically updates the interface with revised order tickets when the video feed changes indicating a new completed order was placed in the pickup area or when an existing completed order was removed from the pickup area.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving an identifier for a retail store from a mobile device operated by a customer who placed an order with the retail store;
   obtaining a video stream for a camera associated with a pickup area of the retail store where completed orders are placed when completed by the retail store based on the identifier;
   monitoring the completed orders when placed in the pickup area and when removed from the pickup area by analyzing the video stream and producing completed order information from the video stream; and
   rendering the completed order information in real time to an interface of the mobile device for viewing by the customer in a remote location from the pickup area.

2. The method of claim 1, wherein receiving further includes causing the mobile device to download or to instantiate the interface on the mobile device.

3. The method of claim 2, wherein causing further includes identifying a unique code that is provided by the interface during download or instantiation on the mobile device and mapping the unique code to the identifier.

4. The method of claim 1, wherein receiving further includes generating a list of available retail stores, rendering the list within the interface, and receiving the identifier as a selection made from the list by the customer.

5. The method of claim 1, wherein receiving further includes receiving store identifying information as search criteria entered by the customer through the interface and obtaining the identifier as a result of searching available stores.

6. The method of claim 1, wherein obtaining further includes mapping the identifier to a camera identifier for the camera and identifying the video stream from a plurality of video streams associated with other cameras of other retail stores based on the camera identifier.

7. The method of claim 1, wherein obtaining further includes establishing a network connection to the camera to receive the video feed in real time from the camera.

8. The method of claim 1, wherein obtaining further includes identifying a network storage location or a network file that the camera is streaming the video feed into based on the identifier and reading the network storage location or the network file to obtain the video feed in real time.

9. The method of claim 1, wherein monitoring further includes passing image frames from the video feed to a trained machine-learning model and receiving pixel coordinates for each completed order present within the video feed as output from the trained machine-learning model.

10. The method of claim 9, wherein passing further includes adjusting pixels associated with the pixel coordinates based on a known camera angle of the camera and a known resolution of the camera and producing adjusted pixels for each completed order present within the video feed.

11. The method of claim 10, wherein adjusting further includes performing Optical Character Recognition (OCR) on the adjusted pixels producing a searchable document comprising identifying text information for each completed order.

12. The method of claim 11, wherein rendering further includes rendering the completed order information with the corresponding identifying text information for each completed order in a list view within the interface for searching and scrolling by the customer using the interface to determine whether the order placed by the customer is present within the pickup area.

13. A method, comprising:
   registering a retailer for remote pickup order customer monitoring;
   providing a code to a store of the retailer and obtaining access to a video feed produced by a camera located in a pickup area of the store during the registering;
   receiving the code from a mobile device operated by a customer who placed an order with the store;
   analyzing the video feed in real time and tracking each completed order and tracking each order ticket associated with each completed order as each completed order is placed in the pickup area or removed from the pickup area; and
   rendering at least each order ticket in an interface accessible to the customer through the mobile device in response to the receiving of the code to provide remote pickup monitoring of the order placed by the customer with the store through the interface.

14. The method of claim 13, wherein providing further includes obtaining access to a digital sign located outside of and adjacent to the store during the registering of the code and sending the code as a unique Quick Response (QR) code that identifies the store for displaying the QR code on the digital sign and for capturing by the mobile device.

15. The method of claim 14, wherein receiving further includes obtaining the code and a mobile device identifier for the mobile device when a mobile device camera of the mobile device captures an image of the QR code from the digital sign and link the code to the store and the camera located in the pickup area.

16. The method of claim 13, wherein analyzing further includes identifying each order ticket from the video feed and processing Optical Character Recognition (OCR) on pixels associated with each order ticket producing text-based ticket information tracked for each order ticket.

17. The method of claim 16, wherein obtaining further includes generating a searchable document for each text-based ticket information of each order ticket.

18. The method of claim 13 further comprising, automatically updating the interface with revised order tickets when the video feed changes indicating a new completed order was placed in the pickup or when an existing completed order was removed from the pickup area.

19. A system, comprising:
   a cloud processing environment comprising at least one server;
   the at least one server comprising a processor and a non-transitory computer-readable storage medium;
   the non-transitory computer-readable storage medium comprises executable instructions; and the executable instructions when executed on the processor from the non-transitory computer-readable storage medium cause the processor to perform operations comprising:
  receiving a code from a mobile device operated by a customer who is located externally to a store where the customer placed on order;
  obtaining a video feed from a camera situated in an order pickup area within the store;
  analyzing the video feed and identifying order ticket information for each completed order placed within the order pickup area and updating a list of completed orders each time a particular completed order is placed in the order pickup area or removed from the order pickup area; and
  rendering the list in real time and each time the list is updated within an interface on the mobile device of the customer.

20. The system of claim 19, wherein the executable instructions when executed on the processor from the non-transitory computer-readable storage medium further cause the processor to perform additional operations comprising:
  receiving, through the interface, at least a portion of specific order ticket information for the order placed by the customer; and
  alerting, through the interface, the customer when the specific order ticket information is identified during an update to the list.

* * * * *